N. B. CREIGHTON.
FUSE VALVE.
APPLICATION FILED DEC. 30, 1909.
973,260.
Patented Oct. 18, 1910.
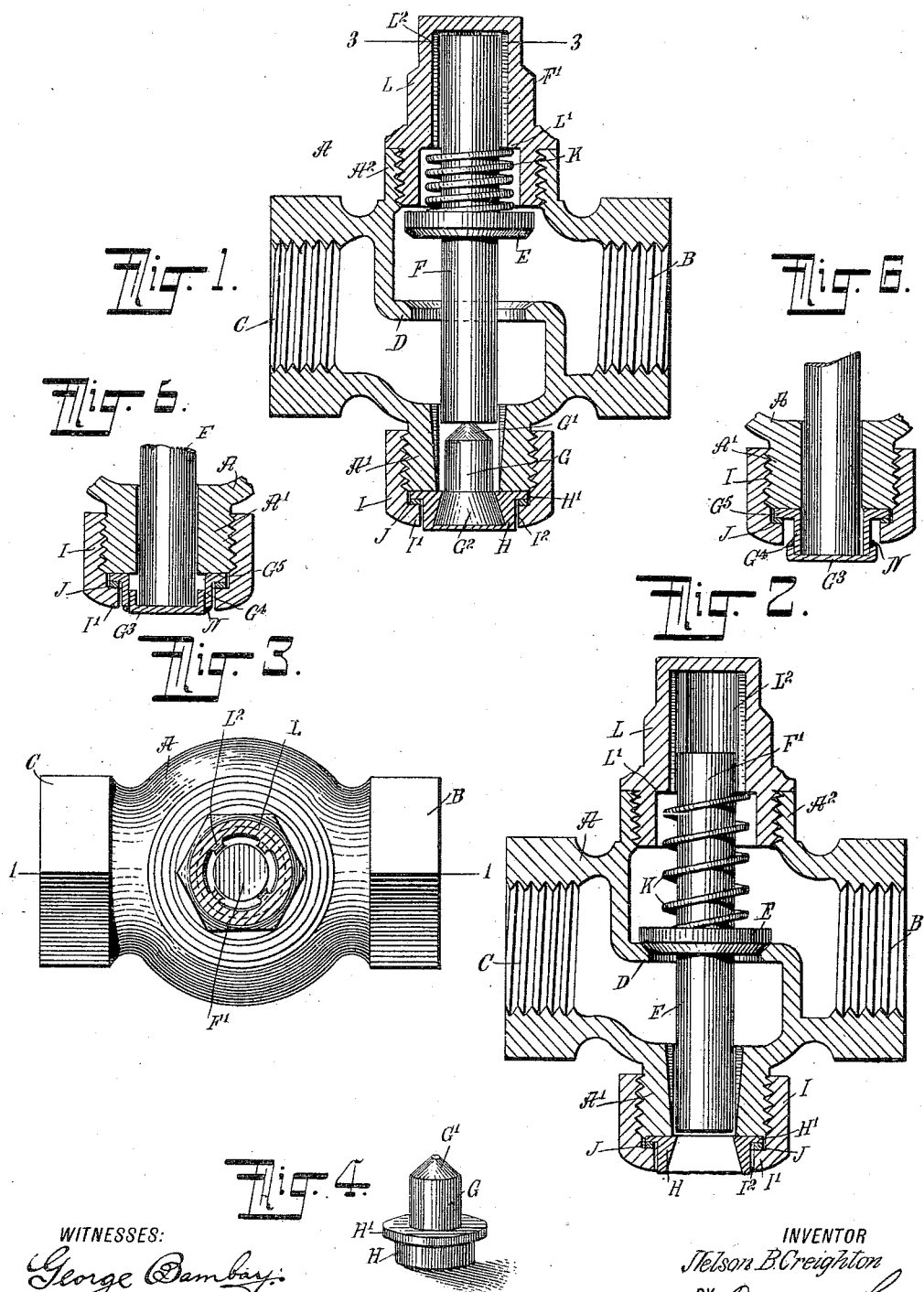
WITNESSES:
George Bamba[?]
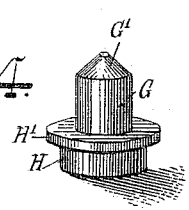
INVENTOR
Nelson B. Creighton
BY Munn & Co
ATTORNEYS ual inlet B, the outlet C, and the valve
UNITED STATES PATENT OFFICE.

NELSON B. CREIGHTON, OF NEW YORK, N. Y.

FUSE-VALVE.

973,260.  Specification of Letters Patent.  Patented Oct. 18, 1910.

Application filed December 30, 1909. Serial No. 535,582.

*To all whom it may concern:*

Be it known that I, NELSON B. CREIGHTON, a citizen of the United States, and a resident of the city of New York, Maspeth, borough of Queens, in the county of Queens and State of New York, have invented a new and Improved Fuse-Valve, of which the following is a full, clear, and exact description.

The object of the invention is to provide a new and improved fuse valve, more especially designed for use in service pipes in buildings and other places, to automatically cut off the flow of the gas or other fluid passing through the service pipe in case of a fire.

For the purpose mentioned, use is made of a valve body having a valve seat adapted to be engaged by a spring-pressed valve, held normally off the seat by a retaining means supported on the valve body and held in place by fusible means, in such a manner that the heat of a fire in a building melts the fusible means, releases the retaining means and consequently the valve, for the latter to close, to shut off the flow of gas or other fluid through the valve body.

A practical embodiment of the invention is represented in the accompanying drawings forming a part of this specification, in which similar characters of reference indicate corresponding parts in all the views.

Figure 1 is a sectional side elevation of the fuse valve, showing the valve proper in normal or raised position, the section being on the line 1—1 of Fig. 3; Fig. 2 is a similar view of the same showing the valve seated; Fig. 3 is a sectional plan view of the same on the line 3—3 of Fig. 1; Fig. 4 is a perspective view of the retaining pin and its fusible cap; Fig. 5 is a sectional side elevation of another form of the improvement; and Fig. 6 is a like view of another form of the improvement.

The valve body A is provided with the usual inlet B, the outlet C, and the valve seat D, interposed between the inlet B and the outlet C. On the valve seat D is adapted to be seated a valve E, having a stem F normally resting on the pointed end G' of a retaining pin G, provided with an enlargement or a head $G^2$, surrounded by a fusible cap H, provided with an external flange H', engaged by an internal flange I' formed on a nut I, screwing on a boss A' of the valve body A. A washer J is preferably interposed between the flanges H' and I', and the fusible cap H extends through the opening of the annular flange I', as will be readily understood by reference to Fig. 1. The valve E is provided with a stem F' opposite the stem F, and on this stem F' is coiled a spring K, resting with its inner end on the valve E and abutting with its outer end on a shoulder L' formed in a cap L, screwing in a boss $A^2$ formed on the valve body A, diametrically opposite the boss A'. The upper end of the stem F' is guided in ribs $L^2$ in the cap L. Now when the several parts are in the position illustrated in Fig. 1, the valve E is held off the seat D by the retaining pin G, which in turn is held in position by the cap H fastened in place by the nut I. When the valve E is in its open position, the spring K is compressed, and when a fire breaks out in a building and the heat melts the fusible cap H, then the pin G is released, thus allowing the valve E to move to its seat D by the action of the spring K, so that the flow of the gas or other liquid through the valve body A is stopped.

By reference to Fig. 1, it will be noticed that the fusible cap H surrounding the enlargement or head $G^2$, is very thin at its outer face and which face is exposed to the heat, so that when the heat is sufficient to melt the fusible cap H, the thin bottom of the cap will readily give way, thus allowing the pin G to pass out of the cap and permitting the valve E to close by the action of its spring K, as previously mentioned. It is also understood that by having the enlargement $G^2$ on the pin G, a large surface is provided for properly supporting the pin G against the pressure exerted by the spring K on the valve E and its stem F, and hence the cap H is not liable to break accidentally to release the valve E when it is not desired to do so.

The retaining pin G is made of iron or other hard metal, for proper contact with the stem F, instead of abutting the latter directly on the fusible cap H. The fusible cap H can be readily cast on the enlargement or head $G^2$ of the stem G, and the cap H with its pin G can be readily placed in position on the valve E by the use of the nut I, as previously explained.

In the forms shown in Figs. 5 and 6, the retaining means for holding the valve in the raised or open position is in the form of a sectional cup $G^3$, $G^4$ instead of the headed pin G, the cup sections $G^3$, $G^4$ being fastened together by solder or like fusible metal N. The section $G^4$ is provided with a flange $G^5$ fastened in position on the boss A' by the nut I. In the form shown in Fig. 5, the cup section $G^3$ is fitted with its side into the cup section $G^4$, while in the form shown in Fig. 6 the side of the cup section $G^3$ fits exteriorly onto the cup section $G^4$. Now in case of a fire the solder N melts, thus releasing the cup section $G^3$ from the cup section $G^4$, to allow the spring K to force the valve E to its seat D. It is understood that the pin G can be used in the caps shown in Figs. 5 and 6, the same as in the cap H shown in Fig 1.

Having thus described my invention, I claim as new and desire to secure by Letters Patent:

1. A fuse valve, comprising a valve body having a valve seat, a spring-pressed valve adapted to be seated on the said seat and having its valve stem engaging an apertured boss on the said valve body, a retaining pin extending in the said boss and engaging the stem of the said valve to normally hold the said valve off its seat and to keep the valve spring under tension, the said pin having a tapering head, a fusible cap for closing the opening of the said boss and for engaging and supporting the said head of the said pin, and a nut screwing on the said boss and fastening the said cap in position on the boss.

2. A fuse valve, comprising a valve body having a seat, a spring-pressed valve adapted to be seated on the said seat, a retaining pin engaging the stem of the said valve to normally hold the same off its seat and to keep the valve spring under tension, the said pin having an enlargement, a fusible cap held on and inclosing the said enlargement and provided with an exterior flange, and a nut screwing on the said valve body and having an internal flange engaging the said cap flange to support the latter.

3. A fuse valve, comprising a valve body having a seat, a spring-pressed valve adapted to be seated on the said seat, a retaining pin engaging the stem of the said valve to normally hold the same off its seat and to keep the valve spring under tension, the said pin having an enlargement, a fusible cap held on and inclosing the said enlargement and provided with an exterior flange, and a nut screwing on the said valve body and having an internal flange engaging the said cap flange to support the latter, the cap extending through the opening of the flange.

In testimony whereof I have signed my name to this specification in the presence of two subscribing witnesses.

NELSON B. CREIGHTON.

Witnesses:
   THEO. G. HOSTER,
   PHILIP D. ROLLHAUS.